June 16, 1925.  
R. G. PETERSON  
STOCK WATERER  
Filed June 7, 1924
1,542,270
FIG_1_
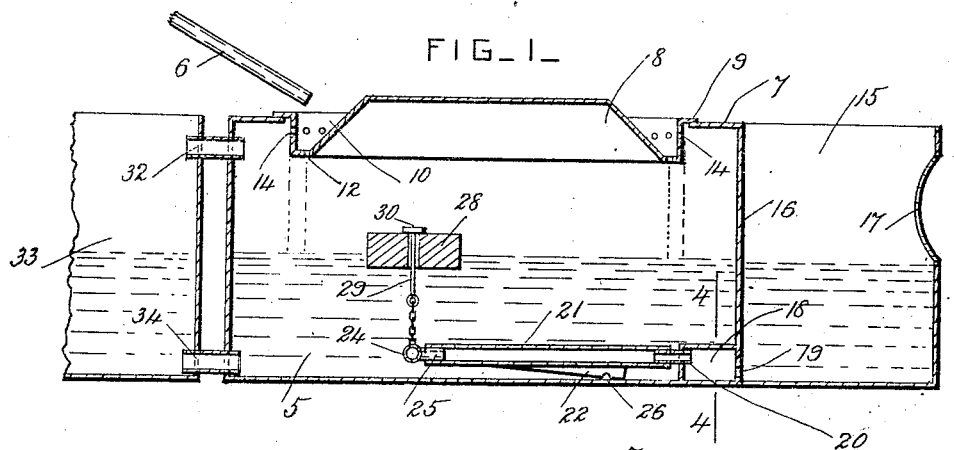
FIG_2_
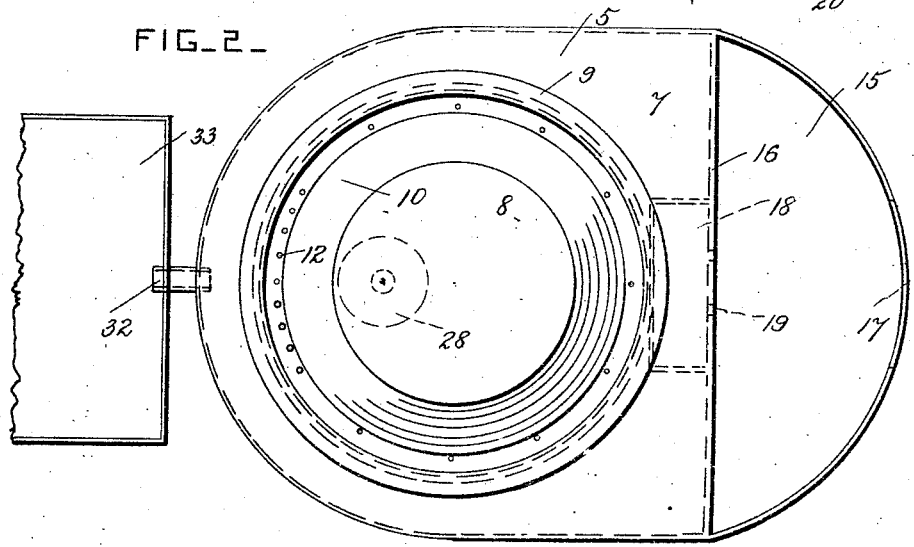
FIG_3_
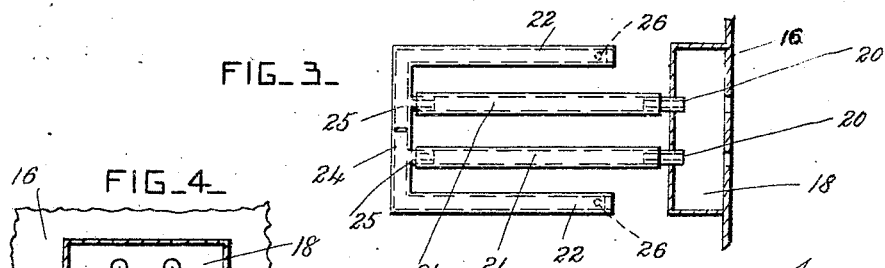
FIG_4_
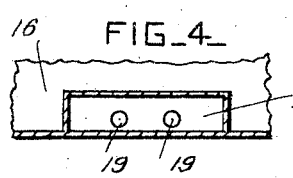
Inventor,
Reuben G. Peterson
by Herbert W. Jenner
Attorney.

Patented June 16, 1925.

1,542,270

UNITED STATES PATENT OFFICE.

REUBEN G. PETERSON, OF WESSINGTON SPRINGS, SOUTH DAKOTA.

STOCK WATERER.

Application filed June 7, 1924. Serial No. 718,611.

*To all whom it may concern:*

Be it known that I, REUBEN G. PETERSON, a citizen of the United States, residing at Wessington Springs, in the county of Jerauld and State of South Dakota, have invented certain new and useful Improvements in Stock Waterers, of which the following is a specification.

This invention relates to tanks for supplying drinking water to stock; and it consists in the novel construction and combination of the parts hereinafter fully described and claimed whereby an abundant supply of water is kept in a closed tank and is let into the drinking trough as needed, and whereby the water in the tank is prevented from freezing in cold weather.

In the drawings, Figure 1 is a vertical section through a stock waterer constructed according to this invention. Fig. 2 is a plan view. Fig. 3 is a plan view of the flexible hose pipes and the nozzles, showing portions of the tank in section. Fig. 4 is a cross-section through the air vessel, taken on the line 4—4 in Fig. 1.

A tank 5 for holding an abundant supply of clean drinking water is provided. The water is let into the tank at intervals through a pipe 6 from any suitable pump. The top 7 of the tank has a large removable cover 8 provided with a peripheral flange 9 which rests on the top 7, and the cover 8 has an annular trough 10 which depends from it within the tank. This trough has a ring of holes 12 at its bottom, and a second ring of holes 14 in its outer side. The water flows into the trough 10 from the pipe 6, and is sprinkled on the water in the tank in a circle, and thereby prevents or delays the formation of ice across the surface of the water in cold weather, and breaks up thin ice which may form across the water in the tank and impede the action of the float which is hereinafter described.

A drinking trough 15 is provided at one side of the tank, and is separated from it by the tank wall 16. Cattle can drink at the top of the trough, and an opening 17 is provided for hogs to drink at, in one side of the trough.

An air vessel 18 is formed inside the tank, at its bottom, against the tank wall 16, and the tank wall 16 has holes 19 at its bottom which connect the lower part of the air vessel with the drinking trough. Two horizontal tubular stems 20 are secured in one side of the air vessel inside the tank opposite the holes 19, but are arranged at a higher level. Hose pipes 21 of flexible material are secured to the two short stems 20, and project side by side within the tank. Two nozzles 22 are arranged in the tank, and are connected together by a cross pipe 24. The cross pipe 24 is connected between its ends to the free end portions of the hose pipes by short branch pipes 25. The free end portions of the nozzles 22 have inlet holes 26 in their lower sides. A float 28 is arranged in the tank inside the space around which the water is sprayed into the tank, and is slidable on a rod or chain 29 which is pivoted to the middle part of the cross pipe 24. The rod 29 has a stop 30 at its top for the float to engage, with as it rises. The float is preferably circular, and it has a hole at its center in which the rod is slidable.

When the tank is filled with water the float raises the cross pipe 24, and the flexible hose pipes permit the nozzles to be supported in an inclined position with their inlet end portions below the level of the cross pipe. The tank 5 has an overflow pipe 32 at its upper part, and water may be allowed to flow through this into a second tank 33 arranged alongside the tank 5. The two tanks may also be connected at their lower parts by a pipe 34. The second tank may have a drinking trough of any approved construction connected to it, or it may form a drinking trough itself. A portion only of the second tank is shown, as its use is not material in carrying out this invention. Earth is banked up around the tank to prevent the water from freezing in it in ordinary cold weather.

The level of the water in the drinking trough is controlled by the action of the float. Air is retained in the upper parts of the hose pipes and the cross pipe when the latter is raised, and air is also retained in the air vessel. The two flexible pipes keep the cross pipe in place laterally, and allow it and the nozzles great freedom of movement in a vertical direction.

The air vessel 18 compensates for slight variations in the level of the water in the drinking trough, and it is preferably placed inside the tank, as it is in the way when it is necessary to clean out the drinking trough. When the tank is full the pipes 21 and 22 are raised by the float, and the columns of water in the pipes 21 offer a resistance to the upward passage of water through the small holes 26, which are of predetermined small size. This resistance is varied by the float in proportion to the height of water in the tank. The pipes 21, 22 and 24 operate as an air vessel, and by having two pipes 21 and two pipes 22, arranged as shown, these pipes can be made smaller than when only one of each is provided. The free ends of the pipes 22 rest on the tank bottom, and the hose pipes are flexed without twisting them, as the float is connected to the middle part of the cross pipe 24.

What I claim is:

1. In a stock waterer, a supply tank provided with a cover having an annular perforated trough for supplying water which projects downwardly inside the tank, a drinking trough, and means for admitting water from the tank to the drinking trough provided with a float arranged within the space in which water is sprayed by the perforated trough.

2. In a stock waterer, a supply tank provided with a cover having an annular water-supply trough which depends within the tank and is provided with a plurality of rows of perforations, a drinking trough, and means for admitting water from the tank to the drinking trough provided with a float arranged in the space around which water is sprayed into the tank through the said perforations.

3. In a stock waterer, a supply tank, a drinking trough, an air vessel having an outlet at its lower part which communicates with the trough, a tubular stem connected to the air vessel and projecting within the tank, a flexible hose pipe connected to the said stem, a cross pipe connected between its ends to the hose pipe, inlet nozzles connected to the ends of the cross pipe, and a float in the tank for sustaining the inlet nozzles in an inclined position, said float being connected to the cross pipe between its ends.

4. In a stock waterer, a supply tank, a drinking trough, an air vessel having an outlet at its lower part which communicates with the trough, two tubular stems connected to the air vessel and projecting laterally of it, two flexible pipes arranged side by side in the tank and secured to the said stems, a cross pipe connected between its ends to the two flexible pipes, inlet nozzles connected to the ends of the cross pipe, and a float in the tank for sustaining the inlet nozzles in an inclined position, said float being connected to the cross pipe between its ends.

In testimony whereof I have affixed my signature.

REUBEN G. PETERSON.